L. B. HESTER.
COFFEE POT.
APPLICATION FILED MAY 10, 1916.
1,225,812. Patented May 15, 1917.
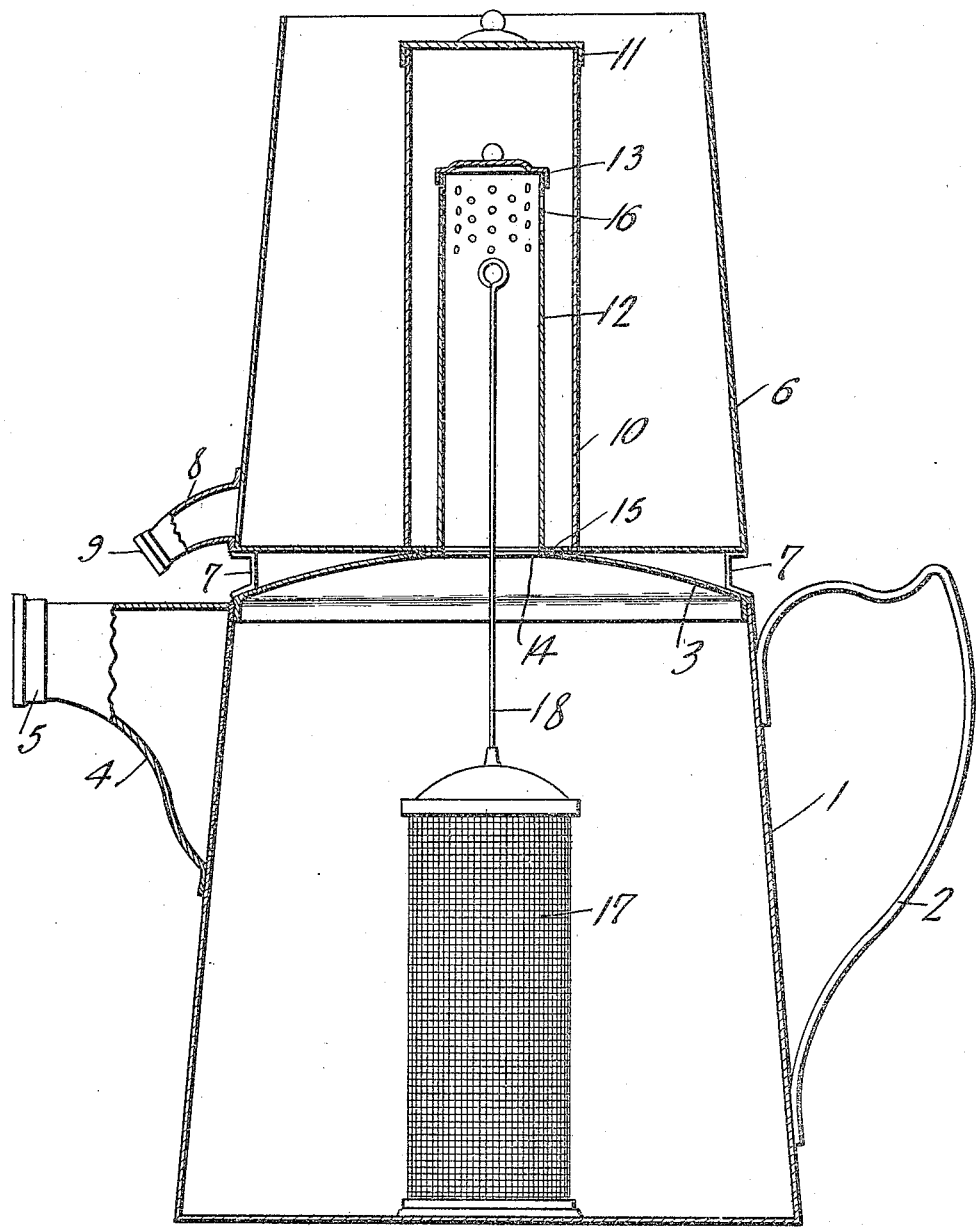
Witnesses
Inventor
L. B. Hester
by
Attorneys

UNITED STATES PATENT OFFICE.

LORING B. HESTER, OF BOND, MISSISSIPPI, ASSIGNOR OF ONE-HALF TO JAMES WILLIAM BLACK, OF BOND, MISSISSIPPI.

COFFEE-POT.

1,225,812.  Specification of Letters Patent.  Patented May 15, 1917.

Application filed May 10, 1916. Serial No. 96,677.

*To all whom it may concern:*

Be it known that I, LORING B. HESTER, a citizen of the United States, residing at Bond, in the county of Harrison and State of Mississippi, have invented a new and useful Coffee-Pot, of which the following is a specification.

The present invention appertains to coffee pots, and aims to provide a coffee pot provided with novel and improved means for condensing the steam, instead of letting it escape, and directing the condensate back into the pot, whereby to retain the essence and flavor of the coffee. This also reduces the cost of the coffee, since waste is eliminated, the aroma being retained in the pot, and the device also increases the strength and improves the taste of the coffee.

It is also an object of the invention to provide means of the nature indicated which is comparatively simple and inexpensive, and which is efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein the figure is a vertical section of the pot, portions being shown in elevation.

The coffee pot proper is designated at 1, and is provided with a suitable handle 2, a removable top or cover 3, and a pouring spout 4. The spout 4 is closed during the boiling of the coffee, by a suitable cap 5, which can be readily removed and applied.

Mounted upon the cover 3 is a cold water receptacle 6, preferably open at the top, that is, a cover need not be used. The bottom of the receptacle 6 is soldered or otherwise secured upon the central portion of the cover 3, and suitable stays or props 7 are secured between the marginal portions of the cover 3 and bottom of the receptacle 6. The receptacle 6 is provided at one side adjacent its bottom with a drain spout 8, normally closed by a removable cap 9, which can be removed for draining the water from the receptacle.

The receptacle 6 has an upstanding tube or sleeve 10 attached to its bottom and arranged centrally of the receptacle, the upper end of said sleeve 10 being closed by a removable cap 11. The receptacle 6 has a second upstanding sleeve or tube 12 upstanding from its bottom concentrically within the sleeve 10, and the upper end of the sleeve 12 which terminates short of the upper end of the sleeve 10 is normally closed by a removable cap 13. The cover 3 and bottom of the receptacle 6 have a central opening 14 registering with the lower end of the sleeve 12, and said cover and bottom are provided with apertures 15 between the two sleeves. The upper end portion of the sleeve 12 has apertures 16.

A cage or foraminous receptacle 17 is disposed within the pot 1 for holding the coffee grounds, and is provided with an upstanding stem 18 projecting into the sleeve 12. This stem 18 permits the cage or receptacle 17 to be readily introduced in and removed from the pot, when the cover 3 is removed.

The pot 1 contains the hot water in which the cage 17 is submerged, and the spout 4 and sleeves 10—12 being closed by caps, prevent the escape of the steam, but the circulation of the steam is not impaired, since the steam can pass upwardly through the sleeve 12 and its apertures 16 into the sleeve 10 which is in contact with the cold water within the receptacle 6. Consequently, the steam within the sleeve 10 will condense, and the condensate will flow downwardly through the apertures 15 back into the pot 1. This retains the aroma of the coffee within the pot for the intended purposes. The cold water can be replenished within the receptacle 6 at such times as is necessary, said receptacle being readily removed from the pot with the cover 3. The caps 11 and 13 can be removed for inspecting the interior of the sleeves or tubes, and for cleaning them out.

Having thus described the invention, what is claimed as new is:

1. A coffee pot, a cold water receptacle supported thereby, a sleeve upstanding within said receptacle and communicating with the pot, and an inner sleeve upstanding within the aforesaid sleeve for conveying the steam from the pot into the first mentioned sleeve.

2. A coffee pot having a cover, a cold water receptacle mounted upon said cover, a sleeve upstanding from the bottom of said receptacle, a second sleeve upstanding from the bottom of the receptacle within the first mentioned sleeve, caps closing the upper ends of said sleeves, the second mentioned sleeve having apertures adjacent its upper end, said cover and bottom of the receptacle having an opening registering with the second mentioned sleeve, and having apertures between the sleeves.

In testimony that I claim the foregoing as my own, I have hereto affixed my signature in the presence of two witnesses.

LORING B. HESTER.

Witnesses:
LEE MORRIS,
L. E. DANTZLER.

Copies of this patent may be obtained for five cents each, by addressing the "Commissioner of Patents, Washington, D. C."